United States Patent
Gunda et al.

(10) Patent No.: US 12,417,101 B2
(45) Date of Patent: Sep. 16, 2025

(54) OVERLAY CODE RETRIEVAL FROM A HOST SYSTEM

(71) Applicant: Micron Technology, Inc., Boise, ID (US)

(72) Inventors: Sridhar Prudviraj Gunda, Karnataka (IN); Mani Raghavendra Aravapalli, Hyderabad (IN); Ritesh Tiwari, Karnataka (IN)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 18/581,273

(22) Filed: Feb. 19, 2024

(65) Prior Publication Data
US 2024/0281254 A1  Aug. 22, 2024

Related U.S. Application Data

(60) Provisional application No. 63/486,373, filed on Feb. 22, 2023.

(51) Int. Cl.
*G06F 9/30* (2018.01)
*G06F 9/445* (2018.01)

(52) U.S. Cl.
CPC ......... *G06F 9/30185* (2013.01); *G06F 9/445* (2013.01); *G06F 9/30145* (2013.01)

(58) Field of Classification Search
CPC ... G06F 9/30185; G06F 9/445; G06F 9/30145
See application file for complete search history.

(56) References Cited

U.S. PATENT DOCUMENTS

| | | | |
|---|---|---|---|
| 6,728,840 B1* | 4/2004 | Shatil | G06F 12/0866 712/240 |
| 7,788,388 B2* | 8/2010 | Piersol | H04L 67/34 709/217 |
| 8,832,354 B2* | 9/2014 | Sokolov | G11C 16/10 711/104 |
| 11,422,934 B2* | 8/2022 | Roberts | G06F 12/0646 |
| 2012/0272223 A1* | 10/2012 | Persson | G06F 9/45516 717/140 |

* cited by examiner

Primary Examiner — Corey S Faherty
(74) Attorney, Agent, or Firm — Holland & Hart LLP

(57) ABSTRACT

Methods, systems, and devices for overlay code retrieval from a host system are described. A memory system may determine that a set of code for execution by a processor of the memory system is absent from an executable memory of the processor. The memory system may prevent the processor from retrieving the set of code from a non-volatile memory of the memory system based on the set of code being designated for retrieval from a host system. The memory system may retrieve the set of code from a memory of a host system, instead of retrieving the set of code from the non-volatile memory, based on the set of code being designated for retrieval from the host system.

20 Claims, 6 Drawing Sheets

OVERLAY CODE RETRIEVAL FROM A HOST SYSTEM

CROSS REFERENCE

The present Application for Patent claims priority to and the benefit of U.S. Patent Application No. 63/486,373 by Gunda et al., entitled "OVERLAY CODE RETRIEVAL FROM A HOST SYSTEM," filed Feb. 22, 2023, assigned to the assignee hereof, and is expressly incorporated by reference in its entirety herein.

TECHNICAL FIELD

The following relates to one or more systems for memory, including overlay code retrieval from a host system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

Figure 1:
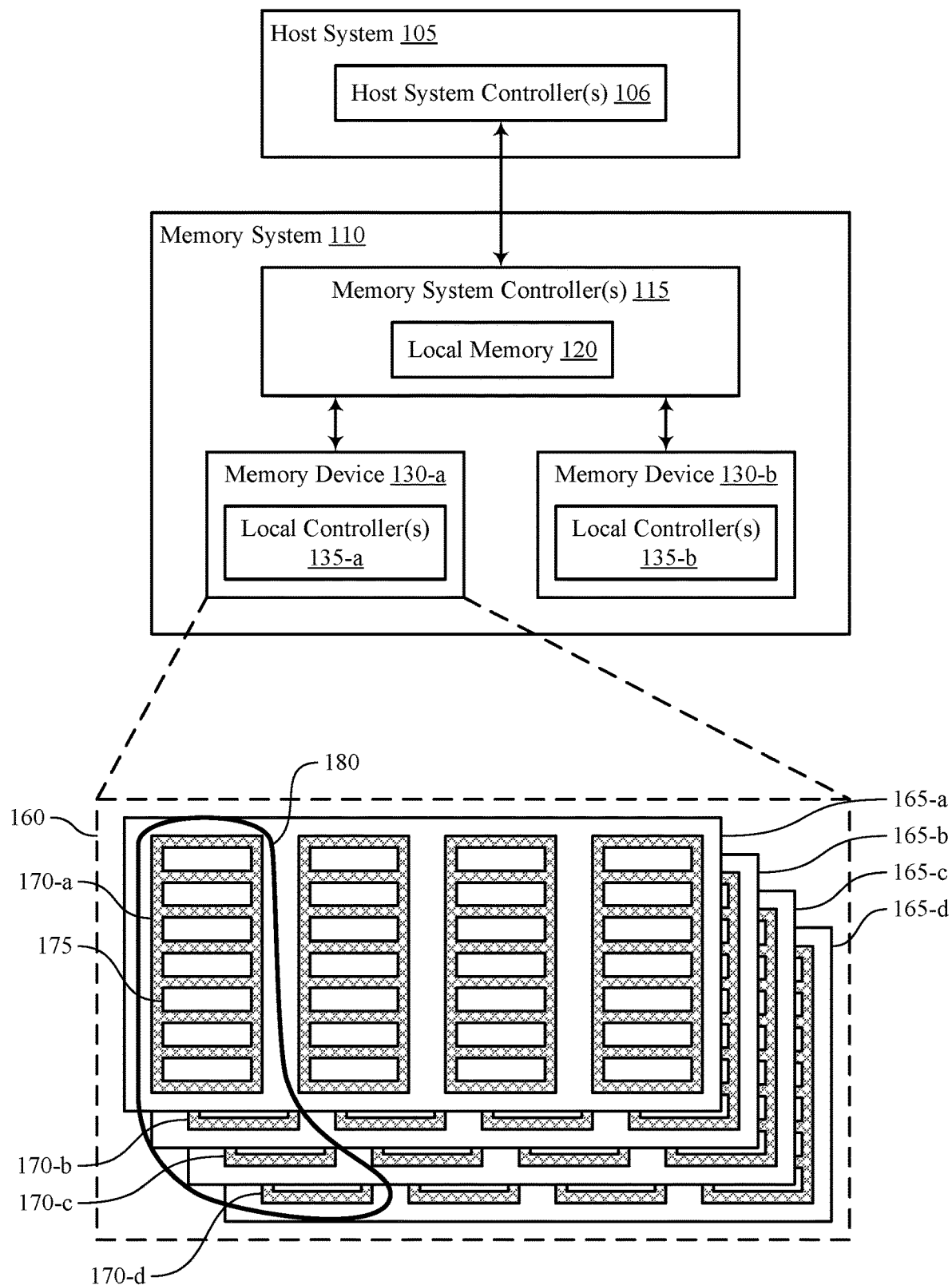
FIG. 1 illustrates an example of a system that supports overlay code retrieval from a host system in accordance with examples as disclosed herein.

A memory system may include a processor that executes code to perform various operations. The processor may include a local (e.g., internal) memory, which may be referred to as an executable memory, that stores code for execution by the processor. However, the local memory may not have sufficient capacity to store all the code for the memory system. So, the memory system may store some of the code for the memory system separately, for example in another memory, which may be referred to as non-executable memory, that is external to the processor. If a set of code for execution by the processor is absent from (e.g., not stored in) the executable memory, the processor may need to retrieve the set of code from the non-executable memory. But retrieving code from the non-executable memory may take a long time, interrupt other data-access operations by the non-executable memory, and/or wearout the non-executable memory, among other disadvantages.

According to the techniques described herein, a memory system may improve performance by retrieving code from a memory of a host system instead of from the non-executable memory of the memory system. The memory of the host system may be accessible by the memory system and may have a lower access latency relative to the non-executable memory of the memory system. To implement such a technique, the memory system may monitor certain information, such as monitoring opcodes (e.g., queued opcodes) for execution by the processor and compare the opcodes with opcodes that are associated with sets of code designated for retrieval from the host system. If the memory system determines that an opcode for execution is both missing from the executable memory and associated with a set of code designated for retrieval from the host system, the memory system may prevent the processor for retrieving the set of code from the non-executable memory and instead retrieve the set of code from the memory of the host system.

In addition to applicability in memory systems as described herein, techniques for improved overlay code retrieval from a host system may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating more efficient and effective overlay code retrieval from a host system, which may decrease processing or latency times, improve response times, or otherwise improve user experience, among other benefits.

Figure 2:
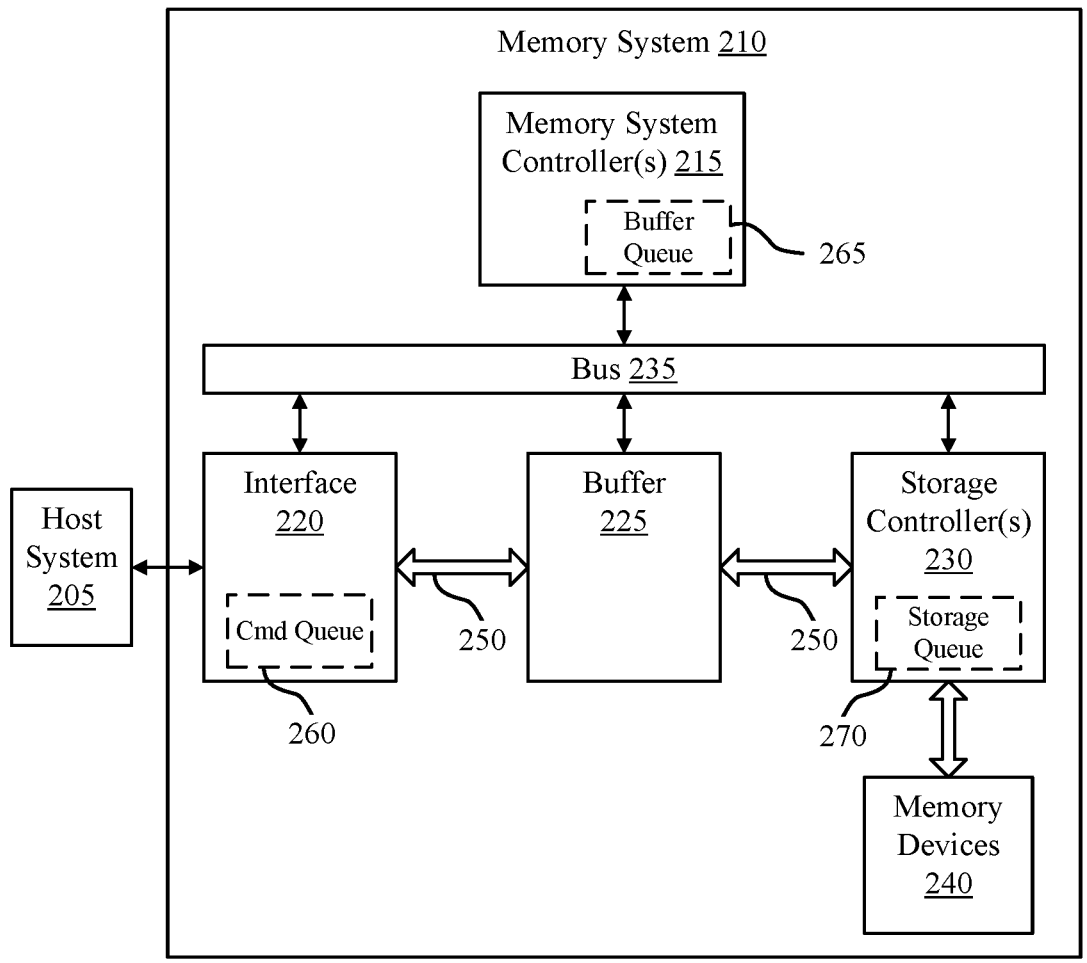
FIG. 2 illustrates an example of a system that supports overlay code retrieval from a host system in accordance with examples as disclosed herein.

Features of the disclosure are initially described in the context of systems, devices, and circuits with reference to FIGS. 1 through 2. Features of the disclosure are described in the context of a system and a process flow with reference to FIGS. 3 through 4. These and other features of the disclosure are further illustrated by and described in the context of an apparatus diagram and flowchart that relate to overlay code retrieval from a host system with reference to FIGS. 5 through 6.

FIG. 1 illustrates an example of a system 100 that supports overlay code retrieval from a host system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with one ore more host system controller(s) 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system 110 may include a processor (e.g., the memory system controller 115) that executes code for operating the memory system 110. The code executed by the processor may be split between an executable memory of the processor and a non-executable (e.g., due to capacity limitations of the executable memory). Accordingly, code that is stored in the non-executable memory (e.g., a memory device 130) may be retrieved from the non-executable memory so that the processor can execute the code.

But accessing the non-executable memory may be a time-consuming process, which may increase the latency of the retrieval process. Additionally, retrieving code from the non-executable memory may consume resources that could otherwise be used for other memory access operations of the non-executable memory, such as data retrieval for the host system 105. Retrieving code from the non-executable memory may also increase the quantity of read operations performed on the non-executable memory, which in turn may decrease the life expectancy of the non-executable memory. Thus, retrieving code from the non-executable memory may decrease the performance of the memory system 110.

According to the techniques described herein, the memory system 110 may improve performance by retrieving code from the host system 105 rather than from the non-executable memory of the memory system 110. For example, the memory system 110 may request code from the host system 105, which may store the code in a memory that has a lower (e.g., faster) access latency compared to the non-executable memory of the memory system 110. So, retrieving code from the host system 105 may reduce the latency of retrieval relative to retrieving the code from the non-executable memory of the memory system 110. Retrieving code from the host system 105 may also free-up resources for other memory access operations at the non-executable memory of the memory system 110, increase the life expectancy of the non-executable memory (e.g., by reducing the quantity of read operations performed on the non-executable memory), or both, among other advantages.

The system 100 may include any quantity of one or more non-transitory computer readable media that support overlay code retrieval from a host system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 (or any combination thereof) to perform associated functions as described herein.

FIG. 2 illustrates an example of a system 200 that supports overlay code retrieval from a host system in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include one or more of NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed (e.g., both being performed during at least partially overlapping durations), which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the memory system 210 may include a processor (e.g., the memory system controller 215) that executes code for operating the memory system 210. Although some code for the memory system 210 may be stored in an executable memory that is included in (or closely coupled with) the processor, not all of the code for the memory system 210 may fit in the executable memory or it may be desirable to leave some space in the executable memory. Rather than retrieving absent code from a non-executable memory (e.g., a memory device 240) of the memory system 210, the memory system 210 may improve performance by retrieving the absent code from the host system 205. Although various examples of the disclosed techniques are described with reference to an mNAND system, the techniques described herein may be implemented by any type of memory system, including Non-Volatile Memory express (NVMe) systems, Secure Digital (SD) memory systems, Universal Flash Storage (UFS) systems, Hard Disk Drive (HDD) memory systems, and Peripheral Component Interconnect express (PCIe) systems.

Figure 3:
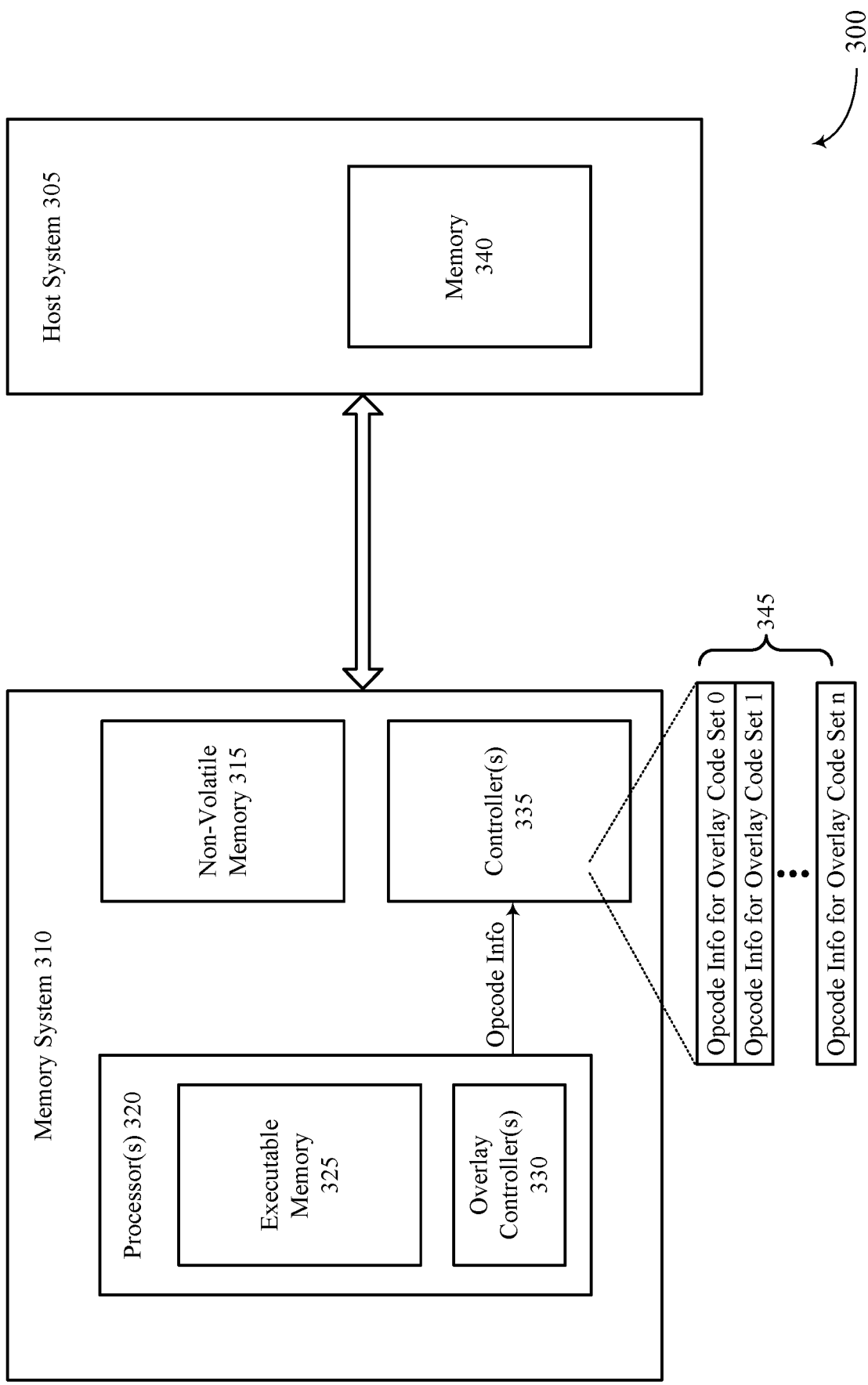
FIG. 3 illustrates an example of a system that supports overlay code retrieval from a host system in accordance with examples as disclosed herein.

FIG. 3 illustrates an example of a system 300 that supports overlay code retrieval from a host system in accordance with examples as disclosed herein. The system 300 may be an example of the system 100 or the system 200 as described with reference to FIGS. 1 and 2, respectively. Accordingly, the memory system 310 may be an example of the memory system 110 or the memory system 210 as described with reference to FIGS. 1 and 2, respectively; and the host system 305 may be an example of the host system 105 or the host system 205 as described with reference to FIGS. 1 and 2, respectively. According to the techniques described herein, the memory system 310 may improve performance by retrieving code for execution from the host system 305 rather than, e.g., retrieving the code from a non-executable memory (e.g., the non-volatile memory 315) of the memory system 310.

The memory system 310 may include a processor 320, which may be configured to execute code (e.g., sets of opcodes) for operating the memory system 310. An opcode may refer to an instruction that specifies an operation to be performed. The processor 320 may include executable memory 325, which may be configured to store some of the code for the memory system 310. In some examples, the executable memory may be SRAM. The processor 320 may also include an overlay controller 330 (which may be a controller with a local memory) that is configured to manage overlay code. Overlay code may refer to code for the memory system 310 that is stored outside of the processor 320 and transferred to the processor 320 (e.g., on-demand) for execution.

The processor 320 may execute sets of code that are stored in the executable memory 325 as well as sets of code that are absent from the executable memory 325 (e.g., sets of overlay code). If a set of code for execution is absent from the executable memory 325 (e.g., if the set of code is overlay code), the memory system 310 may retrieve the set of code from the non-volatile memory 315 or the memory 340 of the host system 305. A set of code may also be referred to as chunk of code or other suitable terminology and may include multiple opcodes (e.g., a contiguous range of sequentially indexed opcodes). In addition to storing overlay code, the non-volatile memory 315 may store other types of information, such as data for the host system 305 and metadata (e.g., data about other data) for managing the non-volatile memory 315.

The controller 335 may control whether the memory system 310 retrieves overlay code from the non-volatile memory 315 or the memory 340 (which may have a lower access latency than the non-volatile memory 315). To do so, the controller 335 may reference a table 345 that indicates opcode information for sets of code (e.g., overlay code) that are designated (e.g., marked, flagged, reserved for, associated with) for retrieval from the host system 305. For example, the table 345 may indicate the starting opcode for a set of code designated for retrieval from the host system 305, potentially along with an offset for the set of code (so that between the starting opcode and the offset, the range of the set of code is defined). Code that is designated for retrieval from the host system 305 may also be referred to as code that is designated for pre-fetching, code that is designated for low-latency retrieval, or other suitable terminology. In some examples, the table 345 may be loaded into the controller 335 on initialization (e.g., power-up) of the memory system 310. In some examples, the controller 335 may be referred to as a Unified Memory Extension (UME) controller, a Host Platform Buffer (HPB) controller, or a Host Managed Buffer (HMB) controller, among other suitable terminology.

The opcode information indicated by the processor 320 may include opcodes for sets of code stored in the executable memory 325 and opcodes for overlay code. Alternatively, the opcode information indicated by the processor 320 may include opcodes for overlay code and exclude opcodes for code stored in the executable memory (e.g., to reduce signaling). That is, the processor 320 (e.g., via the overlay controller 330) may selectively indicate opcodes for overlay code to the controller 335 and may refrain from indicating opcodes for non-overlay code (e.g., code stored in the executable memory 325).

The controller 335 may compare opcode information received from the processor 320 with the opcode information in the table 345. As noted, the opcode information received from the processor 320 may include indications of opcodes that are queued for execution by the processor 320. If an opcode indicated by the processor 320 does not match (e.g., is different than, is not equal to) any of the opcodes (e.g., starting opcodes) associated with the sets of overlay code designated for retrieval from the host system 305 (as indicated by the table 345), the controller 335 may permit the processor 320 (e.g., via the overlay controller 330) to retrieve the associated overlay code from the non-volatile memory 315.

However, if an opcode indicated by the processor 320 matches (e.g., is equal to) an opcode (e.g., a starting opcode) associated with a set of overlay code that is designated for retrieval from the host system 305 (as indicated by the table 345), the controller 335 may prevent the processor 320 from retrieving the associated overlay code from the non-volatile memory 315 and instead retrieve the set of overlay code from the memory 340 of the host system 305. The controller 335 may prevent the processor 320 from retrieving the overlay code from the non-volatile memory 315 by instructing the processor to refrain from retrieving the code from the non-volatile memory 315 or by de-prioritizing the processor from retrieving the code from the non-volatile memory 315, among other options.

The memory system 310 may retrieve overlay code from the host system 305 by communicating a request for the overlay code (e.g., the starting opcode) so that the host system 305 response to the request by providing the overlay code to the memory system 310. After receiving the overlay code is retrieved from the host system 305, the memory system 310 may transfer the overlay code to the processor (e.g., to the local memory of the overlay controller 330) for execution.

Thus, the memory system 310 may initiate retrieval of a set of overlay code in advance of execution of the set of overlay code. For instance, the memory system 310 may initiate retrieval of a set of overlay code x ms or y opcodes in advance of executing the set of overlay code. In some examples, the memory system 310 may determine a timing for initiating retrieval based on (e.g., as a function of) the access latency of the memory 340, based on (e.g., as a function of) the clock frequency of the memory system, or both, among other metrics.

In some examples, the overlay code in the host system 305 may be protected by encryption. In such examples, the memory system 310 may decrypt the overlay code before execution and, if writing the overlay code back to the memory 340, may encrypt the overlay code before transferring the overlay code back to the host system 305. However, even with encryption, retrieving overlay code from the host system 305 may be faster than retrieving overlay code from the non-volatile memory 315.

In some examples, the memory system 310 may be unable to retrieve overlay code from the host system 305. For example, the host system 305 may sometimes (e.g., for a threshold duration of time after power-up) restrict the memory system 310 from accessing the memory 340, or the host system 305 may be otherwise unable to satisfy requests for overlay code from the memory system 310. If the memory system 310 is unable to retrieve a set of overlay code from the host system 305, the memory system 310 may release the overlay controller 330 so that the overlay controller 330 is able to retrieve the set of overlay code from the non-volatile memory 315. For example, the memory system 310 may enable and/or instruct the overlay controller 330 to retrieve the set of overlay code from the non-volatile memory 315.

Thus, the memory system 310 may improve performance by retrieving overlay code from the host system 305 rather than, e.g., retrieving the code from the non-volatile memory 315 of the memory system 310.

Figure 4:
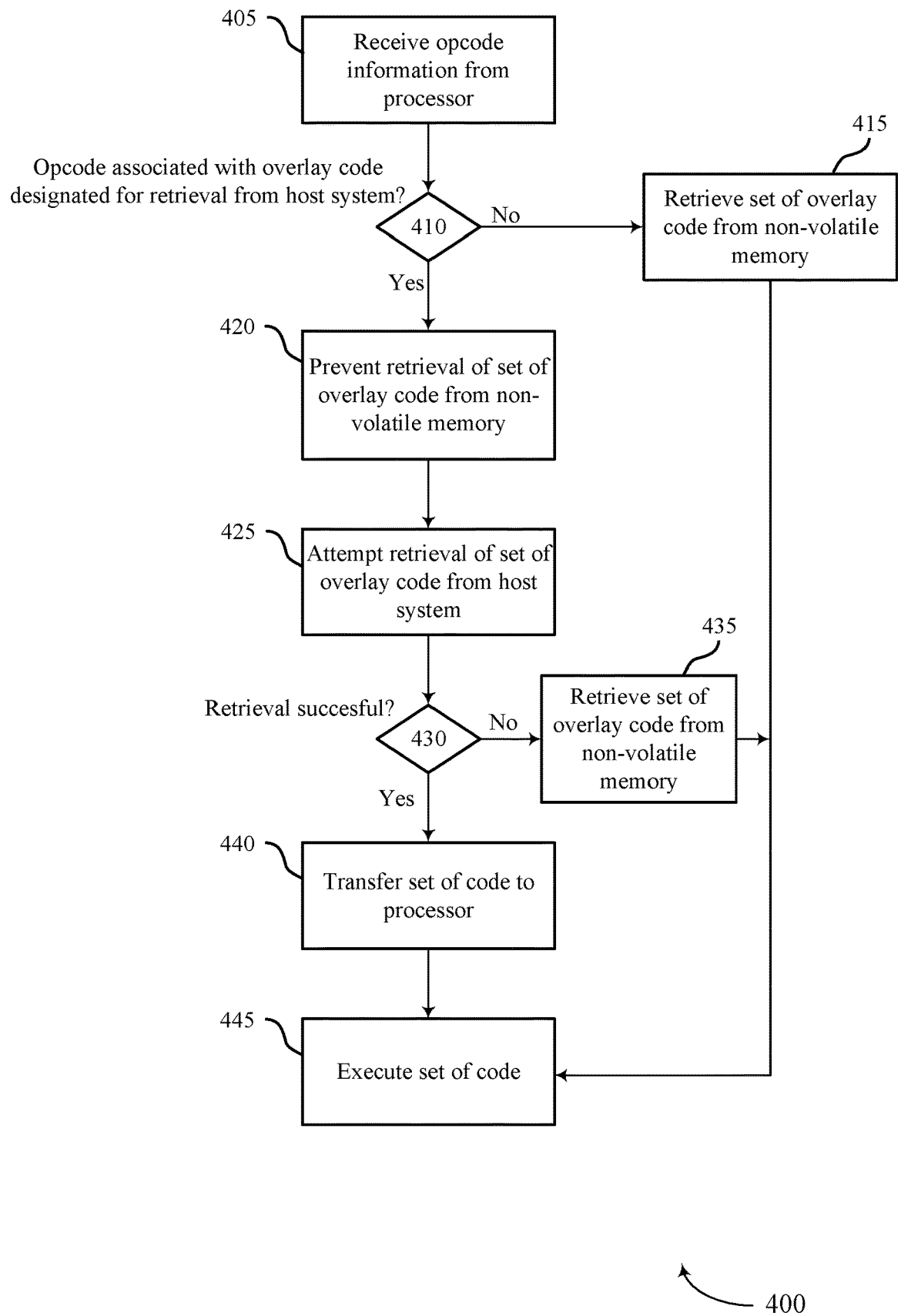
FIG. 4 illustrates an example of a process flow that supports overlay code retrieval from a host system in accordance with examples as disclosed herein.

FIG. 4 illustrates an example of a process flow 400 that supports overlay code retrieval from a host system in accordance with examples as disclosed herein. The process flow 400 may be implemented by a memory system 110, a memory system 210, or a memory system 310 as described with reference to FIGS. 1, 2, and 3, respectively. By implementing the process flow 400, which facilitates selective retrieval of overlay code from a host system, the memory system may reduce the latency of retrieval, free-up resources for other memory access operations at the non-executable memory, increase the life expectancy of the non-executable memory, or any combination thereof, among other advantages.

Aspects of the process flow 400 may be implemented by a controller, among other components. Additionally or alternatively, aspects of the process flow 400 may be implemented as instructions stored in memory (e.g., firmware stored in a memory coupled with a memory system). For example, the instructions, if executed by a controller (e.g., the controller 335), may cause the controller to perform the operations of the process flow 400.

At 405, opcode information may be received. For example, the controller 335 may receive opcode information from the processor 320 (e.g., via the overlay controller 330). The opcode information may indicate one or more sets of code for execution by the processor. In some examples, the opcode information may be received based on (e.g., due to) an opcode indicated by the opcode information being absent from the processor 320.

At 410, it may be determined whether an opcode indicated by the opcode information is associated with a set of overlay code that is designated for retrieval from the host system 305. For example, the memory system 310 may compare the opcode for execution with the opcodes in table 345, which are associated with sets of overlay code that are designated for retrieval from the host system 305. If the opcode for execution matches an opcode in the table 345, the memory system 310 may determine that the opcode is associated with a set of overlay code that is designated for retrieval from the host system 305. Otherwise (e.g., if the opcode for execution does not match an opcode in the table 345), the memory system 310 may determine that the opcode is not associated with a set of overlay code that is designated for retrieval from the host system 305. Put another way, the memory system 310 may determine that the opcode is associated with a set of overlay code that is designated for retrieval from the non-volatile memory 315.

If, at 410, it is determined that the opcode is associated with a set of overlay code that is designated for retrieval from the non-volatile memory, the set of overlay code may be retrieved from the non-volatile memory at 415. For example, the processor 320 (e.g., via the overlay controller 330) may communicate a request for the set of overlay code to the non-volatile memory 315 and in response may receive the set of overlay code from the non-volatile memory 315.

If, at 410, it is determined that the opcode is associated with a set of overlay code that is designated for retrieval from the host system, retrieval of the set of overlay code from the non-volatile memory may be prevented. For example, the controller 335 may send a signal to the overlay controller 330 disabling or de-prioritizing the overlay controller 330 or indicating that the overlay controller 330 is to refrain from retrieving the set of overlay code from the non-volatile memory.

At 425, retrieval of the set of overlay code from the host system may be attempted. The attempt to retrieve the set of overlay code from the host system may be based on (e.g., due to) the set of overlay code being designated for retrieval from the host system 305. The controller 335 may attempt to retrieve the set of overlay code from the host system by communicating a request for the set of overlay code to the host system 305.

At 430, it may be determined whether the attempt to retrieve the set of overlay code from the host system was successful. If, at 430, it is determined that the attempt to retrieve the set of overlay code from the host system was not successful (e.g., the host system 305 did not return the set of overlay code), the set of overlay code may be retrieved from the non-volatile memory at 435. For example, the controller 335 may indicate to the overlay controller 330 that the overlay controller 330 is permitted to retrieve the set of overlay code from the non-volatile memory 315. In some examples (e.g., if the overlay controller 330 is disabled or de-prioritized at 420), the controller 335 may enable the overlay controller 330 so that the overlay controller 330 is able to retrieve the set of overlay code from the non-volatile memory 315.

If, at 430, it is determined that the attempt to retrieve the set of overlay code from the host system was successful (e.g., the host system 305 returned the set of overlay code to the memory system 310), the set of overlay code may, at 440, be transferred to the processor 320 for execution. For example, the controller 335 may receive the set of overlay code from the host system 305 and may communicate the set of overlay code to the processor 320 (e.g., via the overlay controller 330). At 445, the set of overlay code may be executed. For example, the processor 320 may execute the set of overlay code in response to the set of overlay code being transferred to the processor 320.

Thus, the memory system retrieve a set of overlay code from the host system, which may improve the performance of the memory system. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
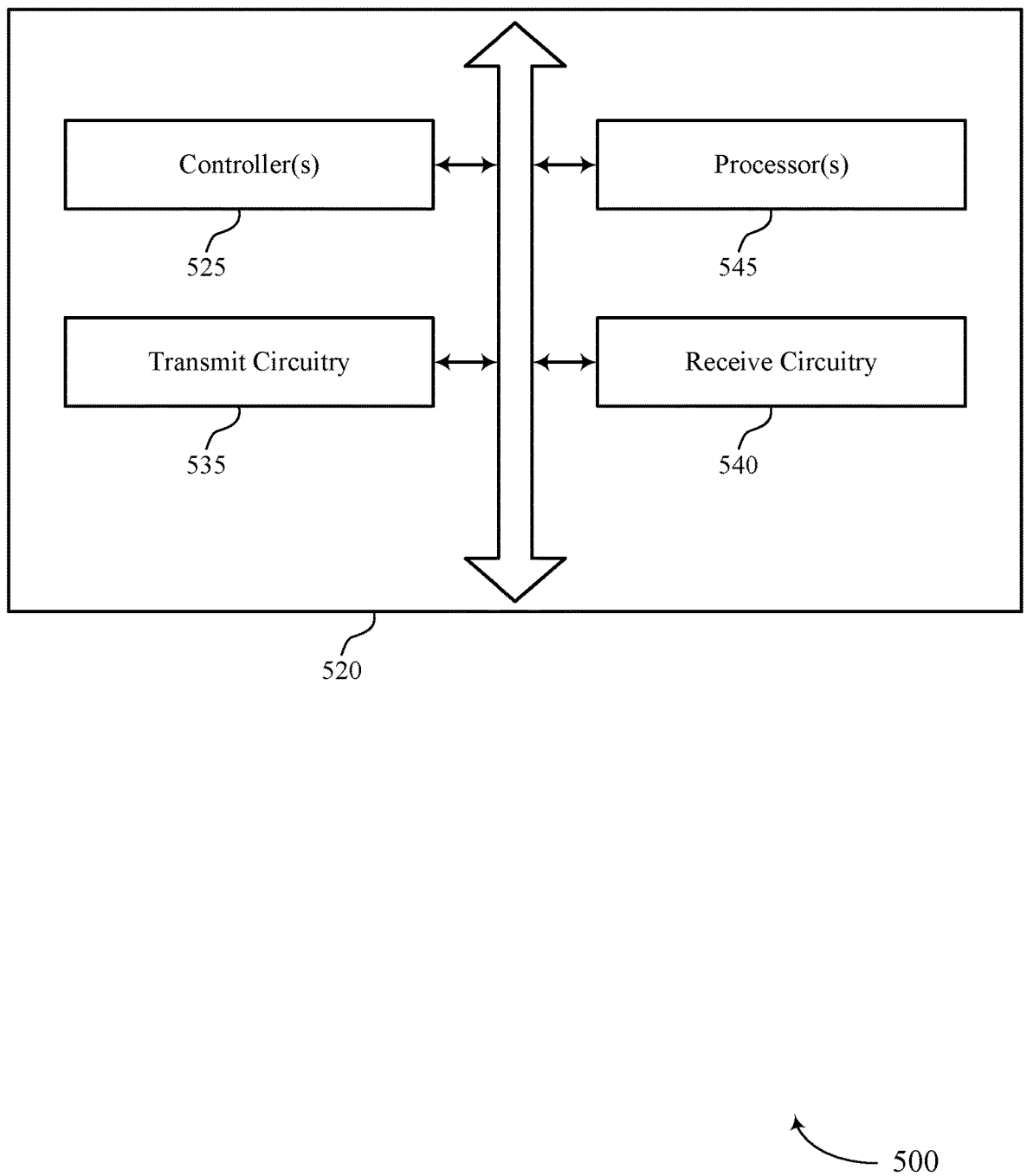
FIG. 5 illustrates a block diagram of a memory system that supports overlay code retrieval from a host system in accordance with examples as disclosed herein.

FIG. 5 illustrates a block diagram 500 of a memory system 520 that supports overlay code retrieval from a host system in accordance with examples as disclosed herein. The memory system 520 may be an example of aspects of a memory system as described with reference to FIGS. 1 through 4. The memory system 520, or various components thereof, may be an example of means for performing various aspects of overlay code retrieval from a host system as described herein. For example, the memory system 520 may include a controller 525, a transmit circuitry 535, a receive circuitry 540, a processor 545, or any combination thereof. Each of these components may communicate, directly or indirectly, with one another (e.g., via one or more buses).

The controller 525 may be configured as or otherwise support a means for determining, by a memory system, whether a set of code for execution by a processor of the memory system is stored in an executable memory of the processor. In some examples, the controller 525 may be configured as or otherwise support a means for preventing, in response to determining that the set of code is absent from the executable memory, the processor from retrieving the set of code from a non-volatile memory of the memory system based at least in part on the set of code being designated for retrieval from a host system. In some examples, the controller 525 may be configured as or otherwise support a means for retrieving the set of code from a memory of the host system based at least in part on the set of code being designated for retrieval from the host system.

In some examples, the controller 525 may be configured as or otherwise support a means for transferring the set of code to the processor for execution based at least in part on retrieving the set of code from the memory of the host system.

In some examples, the controller 525 may be configured as or otherwise support a means for determining whether an opcode for execution by the processor matches an opcode associated with the set of code designated for retrieval from the host system, where the processor is prevented from retrieving the set of code from the non-volatile memory and the set of code is retrieved from the memory of the host system based at least in part on determining that the opcode for execution by the processor matches the opcode associated with the set of code designated for retrieval from the host system.

In some examples, the processor 545 may be configured as or otherwise support a means for communicating an indication of the opcode for execution to a controller configured to interface with the host system, where the controller determines that the opcode for execution matches the opcode associated with the set of code designated for retrieval from the host system based at least in part on the indication of the opcode.

In some examples, the controller 525 may be configured as or otherwise support a means for determining whether the set of code is designated for retrieval from the host system based at least in part on a table that indicates opcodes associated with sets of code designated for retrieval from the host system.

In some examples, the controller 525 may be configured as or otherwise support a means for determining whether a second set of code for execution by the processor of the memory system is absent from the executable memory of the processor and designated for retrieval from the host system. In some examples, the controller 525 may be configured as or otherwise support a means for permitting the processor to retrieve the second set of code from the non-volatile memory of the memory system based at least in part on the memory system being unable to retrieve the second set of code from the memory of the host system.

In some examples, the controller 525 may be configured as or otherwise support a means for communicating to the processor an indication that the processor is to retrieve the second set of code from the non-volatile memory based at least in part on the memory system being unable to retrieve the second set of code from the memory of the host system.

In some examples, the controller 525 may be configured as or otherwise support a means for determining whether a second set of code for execution by the processor of the memory system is absent from the executable memory of the processor. In some examples, the controller 525 may be configured as or otherwise support a means for permitting the processor to retrieve the second set of code from the non-volatile memory of the memory system based at least in part on the second set of code not being designated for retrieval from the host system.

In some examples, to support retrieving the set of code, the transmit circuitry 535 may be configured as or otherwise support a means for communicating a request for the set of code to the host system. In some examples, to support retrieving the set of code, the receive circuitry 540 may be configured as or otherwise support a means for receiving the set of code from the host system in response to communicating the request.

Figure 6:
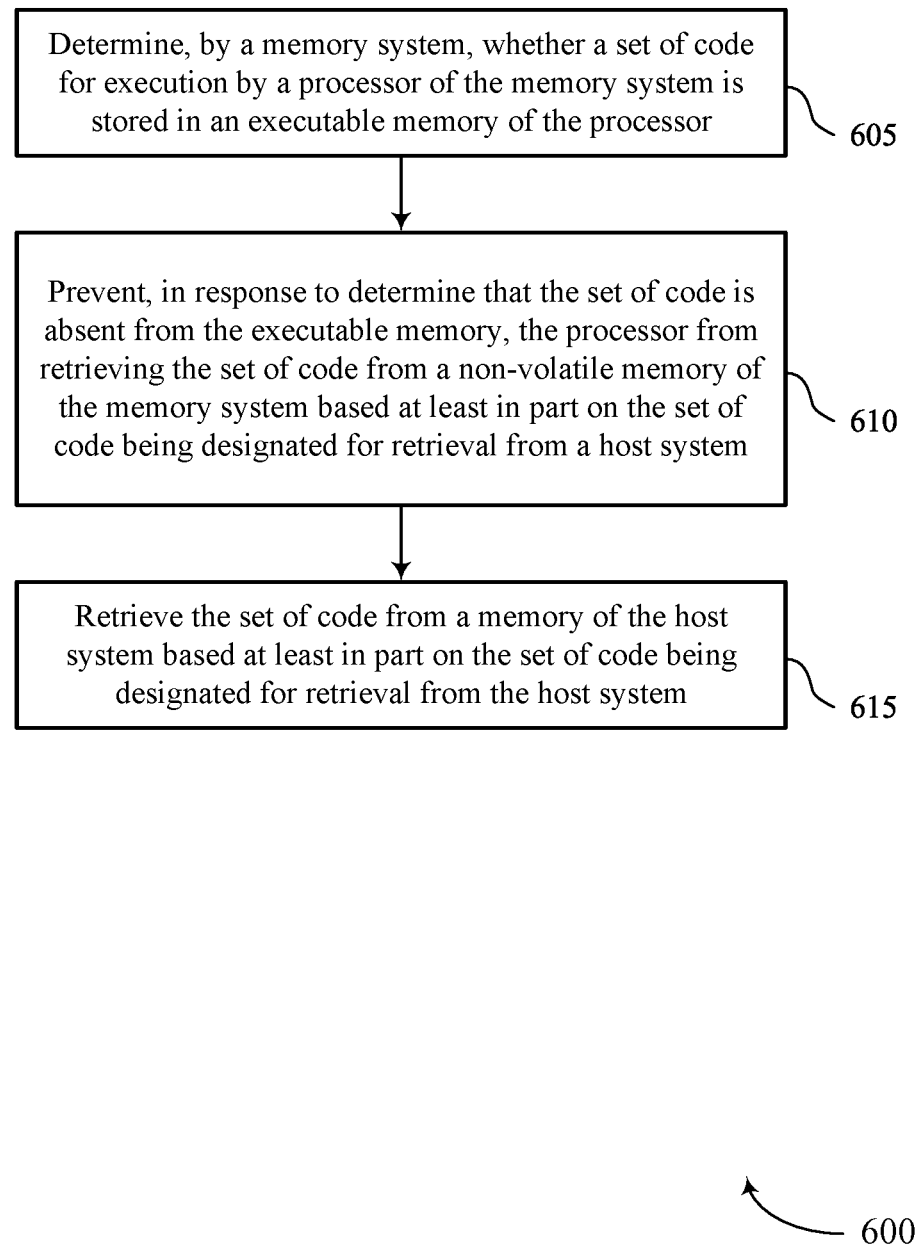
FIG. 6 illustrates a flowchart showing a method or methods that support overlay code retrieval from a host system in accordance with examples as disclosed herein.

FIG. 6 illustrates a flowchart showing a method 600 that supports overlay code retrieval from a host system in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include determining, by a memory system, whether a set of code for execution by a processor of the memory system is stored in an executable memory of the processor. The operations of 605 may be performed in accordance with examples as disclosed herein. In some examples, aspects of the operations of 605 may be performed by a controller 525 as described with reference to FIG. 5.

At 610, the method may include preventing, in response to determining that the set of code is absent from the executable memory, the processor from retrieving the set of code from a non-volatile memory of the memory system based at least in part on the set of code being designated for retrieval from a host system. The operations of 610 may be performed in accordance with examples as disclosed herein. In some examples, aspects of the operations of 610 may be performed by a controller 525 as described with reference to FIG. 5.

At 615, the method may include retrieving the set of code from a memory of the host system based at least in part on the set of code being designated for retrieval from the host system. The operations of 615 may be performed in accordance with examples as disclosed herein. In some examples, aspects of the operations of 615 may be performed by a controller 525 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, by a memory system, whether a set of code for execution by a processor of the memory system is stored in an executable memory of the processor; preventing, in response to determining that the set of code is absent from the executable memory, the processor from retrieving the set of code from a non-volatile memory of the memory system based at least in part on the set of code being designated for retrieval from a host system; and retrieving the set of code from a memory of the host system based at least in part on the set of code being designated for retrieval from the host system.

Aspect 2: The method, apparatus, or non-transitory computer-readable medium of aspect 1, further including operations, features, circuitry, logic, means, or instructions, or any combination thereof for transferring the set of code to the processor for execution based at least in part on retrieving the set of code from the memory of the host system.

Aspect 3: The method, apparatus, or non-transitory computer-readable medium of any of aspects 1 through 2, further including operations, features, circuitry, logic, means, or instructions, or any combination thereof for determining whether an opcode for execution by the processor matches an opcode associated with the set of code designated for retrieval from the host system, where the processor is prevented from retrieving the set of code from the non-volatile memory and the set of code is retrieved from the memory of the host system based at least in part on determining that the opcode for execution by the processor matches the opcode associated with the set of code designated for retrieval from the host system.

Aspect 4: The method, apparatus, or non-transitory computer-readable medium of aspect 3, further including operations, features, circuitry, logic, means, or instructions, or any combination thereof for communicating an indication of the opcode for execution to a controller configured to interface with the host system, where the controller determines that the opcode for execution matches the opcode associated with the set of code designated for retrieval from the host system based at least in part on the indication of the opcode.

Aspect 5: The method, apparatus, or non-transitory computer-readable medium of any of aspects 1 through 4, further including operations, features, circuitry, logic, means, or instructions, or any combination thereof for determining whether the set of code is designated for retrieval from the host system based at least in part on a table that indicates opcodes associated with sets of code designated for retrieval from the host system.

Aspect 6: The method, apparatus, or non-transitory computer-readable medium of any of aspects 1 through 5, further including operations, features, circuitry, logic, means, or instructions, or any combination thereof for determining whether a second set of code for execution by the processor of the memory system is absent from the executable memory of the processor and designated for retrieval from the host system and permitting the processor to retrieve the second set of code from the non-volatile memory of the memory system based at least in part on the memory system being unable to retrieve the second set of code from the memory of the host system.

Aspect 7: The method, apparatus, or non-transitory computer-readable medium of aspect 6, further including operations, features, circuitry, logic, means, or instructions, or any combination thereof for communicating to the processor an indication that the processor is to retrieve the second set of code from the non-volatile memory based at least in part on the memory system being unable to retrieve the second set of code from the memory of the host system.

Aspect 8: The method, apparatus, or non-transitory computer-readable medium of any of aspects 1 through 7, further including operations, features, circuitry, logic, means, or instructions, or any combination thereof for determining whether a second set of code for execution by the processor of the memory system is absent from the executable memory of the processor and permitting the processor to retrieve the second set of code from the non-volatile memory of the memory system based at least in part on the second set of code not being designated for retrieval from the host system.

Aspect 9: The method, apparatus, or non-transitory computer-readable medium of any of aspects 1 through 8, where retrieving the set of code includes operations, features, circuitry, logic, means, or instructions, or any combination thereof for communicating a request for the set of code to the host system and receiving the set of code from the host system in response to communicating the request.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 10: An apparatus, including: a non-volatile memory; and a controller coupled with the non-volatile memory and configured to cause the apparatus to: determine whether a set of code for execution by a processor of the apparatus is stored in an executable memory of the processor; prevent, in response to determining that the set of code is absent from the executable memory, the processor from retrieving the set of code from the non-volatile memory of the apparatus based at least in part on the set of code being designated for retrieval from a host system; and retrieve the set of code from a memory of the host system based at least in part on the set of code being designated for retrieval from the host system.

Aspect 11: The apparatus of aspect 10, where the controller is further configured to cause the apparatus to: transfer the set of code to the processor for execution based at least in part on retrieving the set of code from the memory of the host system.

Aspect 12: The apparatus of any of aspects 10 through 11, where the controller is further configured to cause the apparatus to: determine whether an opcode for execution by the processor matches an opcode associated with the set of code designated for retrieval from the host system, where the processor is prevented from retrieving the set of code from the non-volatile memory and the set of code is retrieved from the memory of the host system based at least in part on determining that the opcode for execution by the processor matches the opcode associated with the set of code designated for retrieval from the host system.

Aspect 13: The apparatus of aspect 12, where the controller is further configured to cause the apparatus to: communicate an indication of the opcode for execution to a controller configured to interface with the host system, where the controller determines that the opcode for execution matches the opcode associated with the set of code designated for retrieval from the host system based at least in part on the indication of the opcode.

Aspect 14: The apparatus of any of aspects 10 through 13, where the controller is further configured to cause the apparatus to: determine whether the set of code is designated for retrieval from the host system based at least in part on a table that indicates opcodes associated with sets of code designated for retrieval from the host system.

Aspect 15: The apparatus of any of aspects 10 through 14, where the controller is further configured to cause the apparatus to: determine whether a second set of code for execution by the processor of the apparatus is absent from the executable memory of the processor and designated for retrieval from the host system; and permit the processor to retrieve the second set of code from the non-volatile memory of the apparatus based at least in part on the apparatus being unable to retrieve the second set of code from the memory of the host system.

Aspect 16: The apparatus of aspect 15, where the controller is further configured to cause the apparatus to: communicate to the processor an indication that the processor is to retrieve the second set of code from the non-volatile memory based at least in part on the apparatus being unable to retrieve the second set of code from the memory of the host system.

Aspect 17: The apparatus of any of aspects 10 through 16, where the controller is further configured to cause the apparatus to: determine whether a second set of code for execution by the processor of the apparatus is absent from the executable memory of the processor; and permit the processor to retrieve the second set of code from the non-volatile memory of the apparatus based at least in part on the second set of code not being designated for retrieval from the host system.

Aspect 18: The apparatus of any of aspects 10 through 17, where the controller is configured to cause the apparatus to retrieve the set of code by being configured to cause the apparatus to: communicate a request for the set of code to the host system; and receive the set of code from the host system in response to communicating the request.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more non-volatile memories; and
one or more controllers coupled with the one or more non-volatile memories and configured to cause the apparatus to:
determine whether a set of code for execution by a processor of the apparatus is stored in an executable memory of the processor;
prevent, in response to determining that the set of code is absent from the executable memory, the processor from retrieving the set of code from the one or more non-volatile memories of the apparatus based at least in part on the set of code being designated for retrieval from a host system; and
retrieve the set of code from a memory of the host system based at least in part on the set of code being designated for retrieval from the host system.

2. The apparatus of claim 1, wherein the one or more controllers are further configured to cause the apparatus to:
transfer the set of code to the processor for execution based at least in part on retrieving the set of code from the memory of the host system.

3. The apparatus of claim 1, wherein the one or more controllers are further configured to cause the apparatus to:
determine whether an opcode for execution by the processor matches an opcode associated with the set of code designated for retrieval from the host system, wherein the processor is prevented from retrieving the set of code from the one or more non-volatile memories and the set of code is retrieved from the memory of the host system based at least in part on determining that the opcode for execution by the processor matches the opcode associated with the set of code designated for retrieval from the host system.

4. The apparatus of claim 3, wherein the one or more controllers are further configured to cause the apparatus to:
communicate an indication of the opcode for execution to a controller configured to interface with the host system, wherein the controller determine that the opcode for execution matches the opcode associated with the set of code designated for retrieval from the host system based at least in part on the indication of the opcode.

5. The apparatus of claim 1, wherein the one or more controllers are further configured to cause the apparatus to:
determine whether the set of code is designated for retrieval from the host system based at least in part on a table that indicates opcodes associated with sets of code designated for retrieval from the host system.

6. The apparatus of claim 1, wherein the one or more controllers are further configured to cause the apparatus to:
determine whether a second set of code for execution by the processor of the apparatus is absent from the executable memory of the processor and designated for retrieval from the host system; and
permit the processor to retrieve the second set of code from the one or more non-volatile memories of the apparatus based at least in part on the apparatus being unable to retrieve the second set of code from the memory of the host system.

7. The apparatus of claim 6, wherein the one or more controllers are further configured to cause the apparatus to:
communicate to the processor an indication that the processor is to retrieve the second set of code from the one or more non-volatile memories based at least in part on the apparatus being unable to retrieve the second set of code from the memory of the host system.

8. The apparatus of claim 1, wherein the one or more controllers are further configured to cause the apparatus to:
determine whether a second set of code for execution by the processor of the apparatus is absent from the executable memory of the processor; and
permit the processor to retrieve the second set of code from the one or more non-volatile memories of the apparatus based at least in part on the second set of code not being designated for retrieval from the host system.

9. The apparatus of claim 1, wherein the one or more controllers are configured to cause the apparatus to retrieve the set of code by being configured to cause the apparatus to:

communicate a request for the set of code to the host system; and receive the set of code from the host system in response to communicating the request.

10. A method, comprising:

determining, by a memory system, whether a set of code for execution by a processor of the memory system is stored in an executable memory of the processor;

preventing, in response to determining that the set of code is absent from the executable memory, the processor from retrieving the set of code from one or more non-volatile memories of the memory system based at least in part on the set of code being designated for retrieval from a host system; and retrieving the set of code from a memory of the host system based at least in part on the set of code being designated for retrieval from the host system.

11. The method of claim 10, further comprising:

transferring the set of code to the processor for execution based at least in part on retrieving the set of code from the memory of the host system.

12. The method of claim 10, further comprising:

determining whether an opcode for execution by the processor matches an opcode associated with the set of code designated for retrieval from the host system, wherein the processor is prevented from retrieving the set of code from the one or more non-volatile memories and the set of code is retrieved from the memory of the host system based at least in part on determining that the opcode for execution by the processor matches the opcode associated with the set of code designated for retrieval from the host system.

13. The method of claim 12, further comprising:

communicating an indication of the opcode for execution to a controller configured to interface with the host system, wherein the controller determines that the opcode for execution matches the opcode associated with the set of code designated for retrieval from the host system based at least in part on the indication of the opcode.

14. The method of claim 10, further comprising:

determining whether the set of code is designated for retrieval from the host system based at least in part on a table that indicates opcodes associated with sets of code designated for retrieval from the host system.

15. The method of claim 10, further comprising:

determining whether a second set of code for execution by the processor of the memory system is absent from the executable memory of the processor and designated for retrieval from the host system; and permitting the processor to retrieve the second set of code from the one or more non-volatile memories of the memory system based at least in part on the memory system being unable to retrieve the second set of code from the memory of the host system.

16. The method of claim 15, further comprising:

communicating to the processor an indication that the processor is to retrieve the second set of code from the one or more non-volatile memories based at least in part on the memory system being unable to retrieve the second set of code from the memory of the host system.

17. The method of claim 10, further comprising:

determining whether a second set of code for execution by the processor of the memory system is absent from the executable memory of the processor; and permitting the processor to retrieve the second set of code from the one or more non-volatile memories of the memory system based at least in part on the second set of code not being designated for retrieval from the host system.

18. The method of claim 10, wherein retrieving the set of code comprises:

communicating a request for the set of code to the host system; and receiving the set of code from the host system in response to communicating the request.

19. A non-transitory computer-readable medium storing code comprising instructions which, when executed by a processor of an electronic device, cause the electronic device to:

determine whether a set of code for execution by the processor of the electronic device is stored in an executable memory of the processor;

prevent, in response to determining that the set of code is absent from the executable memory, the processor from retrieving the set of code from one or more non-volatile memories of the electronic device based at least in part on the set of code being designated for retrieval from a host system; and retrieve the set of code from a memory of the host system based at least in part on the set of code being designated for retrieval from the host system.

20. The non-transitory computer-readable medium of claim 19, wherein the instructions, when executed by the processor of the electronic device, further cause the electronic device to:

transfer the set of code to the processor for execution based at least in part on retrieving the set of code from the memory of the host system.

\* \* \* \* \*